3,179,591
LUBRICATING COMPOSITIONS

Stephen A. Herbert, Jr., Martinez, Calif., assignor to Shell Oil Company, New York, N.Y., a corporation of Delaware
No Drawing. Filed Apr. 25, 1960, Ser. No. 24,205
1 Claim. (Cl. 252—51.5)

This invention relates to improved hydrocarbon lubricants, and particularly to mineral lubricating oil compositions which possess good detergency and corrosion or rust inhibiting properties.

It is known that certain polymeric nitrogen-containing compounds in which the nitrogen-containing groups may be amino or amido groups such as vinylpyridines or vinylpyrrolidones, function as detergents when added in small amounts to lubricants such as mineral lubricating oils. However, copolymers of this type have been found to be corrosive and under severe conditions of use such as under extreme temperatures and pressure they have been found to be shear unstable resulting in sludging and other undesirable side effects.

It has now been discovered that excellent detergent and corrosion inhibiting lubricating oil compositions are provided by dispersing in lubricating oils such as mineral lubricating oils containing polymeric nitrogen-containing detergents small amounts of an unusual corrosion inhibitor which is a polyalkyl hydroxybenzyl compound having attached to the —$CH_2$ radical of the benzyl

group a polar substituent —XY where X is selected from the group of oxygen or sulfur and Y is selected from the group of hydrogen atom, hydrocarbyl, hydrocarbyl acyl, or a polyalkyl hydroxybenzyl oxo or thio radicals, all of the hydrocarbyl radicals in the molecule having up to 20 carbon atoms. The novel corrosion inhibitors, which normally function as anti-oxidants may be represented by the Formula I

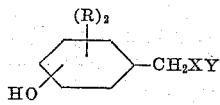

where R is an alkyl radical and X and Y are as defined above. The preferable phenolic compound can be represented by the Formula II

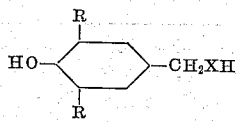

where at least one of the R's is a tertiary alkyl group and X is as defined above, preferably being an oxygen atom.

The detergent nitrogen-containing polymers useful in compositions of the present invention include copolymers of monomers having polymerized linkages and containing nitrogen-containing groups which may be amino or amido groups. They may be derived from polymerizable monomers containing primary, secondary or tertiary (the latter two are preferred) amino nitrogen, including heterocyclic amino or amido nitrogen-containing substances, having an ethylenically unsaturated polymerizable group. These detergent polymers may be obtained by polymerizing vinyl substituted heterocyclic nitro-containing substances such as vinyl pyridine, vinyl picoline and vinyl quinoline, vinyl pyrrolidone or vinyl arylamines such as para-aminostyrene, or polyamines prepared by reducing, in the presence of ammonia or primary or secondary amines, with polymerizable unsaturated alcohols, acids or esters such as acrylates and methacrylates of long chain fatty acids, and the like. The preferred polymeric amino or amido compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals such as are described in British patent specification 760,544 and U.S. Patents 2,839,512 and 2,889,282. The copolymers include: copolymer of stearyl methacrylate and 2-methyl-5-vinyl pyridine; copolymer of stearyl methacrylate, lauryl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate and 2-methyl-5-vinyl pyridine; and similar copolymers in which the methyl methacrylate is replaced by butyl methacrylate and the 2-methyl-5-vinyl pyridine is replaced by 5-ethyl-2-vinyl pyridine; or copolymers of lauryl methacrylate and N-vinyl pyrrolidone or similar copolymers as described in Belgian Patent 550,442 and British Patent 808,664, and mixtures thereof. Acrylate-vinyl pyrrolidone copolymers are sold by Rohm and Haas under the designations Acrylloid 315X or 917 or 966 and are copolymers of N-vinyl pyrrolidone and lauryl methacrylate of varying molecular weights. Other suitable polymeric amines are those availabe commercially such as those sold by E. I. du Pont de Nemours and Co. under the designations LOA 564 and 565, which are copolymers of lauryl methacrylate and diethylaminoethylmethacrylate (see U.S. Patent 2,737,496).

Particularly preferred detergent polymers are the copolymers of vinyl pyridine and mixtures of dissimilar methacrylate esters, the preparation of which is illustrated by the following examples.

EXAMPLES I

A mixture of 25% of 2-methyl-5-vinyl pyridine and 75% stearyl methacrylate were heated in a 50–50 mixture of benzene and a light mineral oil (East Texas 100 SSU at 100° F. neutral) to about 120° C. at which time 0.25% wt. of ditert.butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II

30% stearyl methacrylate, 51% lauryl methacrylate, 14% methyl methacrylate and 5.0% 2-methyl-5-vinyl pyridine were charged to a 300-gallon stainless steel autoclave. A 50–50 mixture of benzene and neutral petroleum oil was then added to the autoclave so as to furnish 1 part of the mixture per 3 parts of the total monomer. 0.25% of di-tertbutyl peroxide was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymer had a molecular weight of about 600,000 and a nitrogen content of 0.54%.

The corrosion inhibitor for the above detergents include the polyalkyl hydroxylbenzyl alcohols or polyalkyl hydroxybenzyl mercaptans and derivatives thereof as defined above. The preferred classes of these compounds are the 3,5-dialkyl-4-hydroxybenzyl alcohols having the Formula III

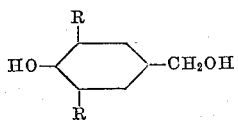

where the R's are as defined above and preferably are $C_{3-8}$ alkyl radicals and include compounds such as 3,5-dimethyl-4-hydroxybenzyl alcohol, 3-methyl-5-ethyl-4-hydroxybenzyl alcohol, 3-ethyl-5-propyl-4-hydroxybenzyl alcohol, 3-methyl-5-hexyl-4-hydroxybenzyl alcohol, 3,5-ditert.butyl-4-hydroxybenzyl alcohol, 3,5-diisopropyl-4-hydroxylbenzyl alcohol, 3-isopropyl-5-t.butyl-4-hydroxylbenzyl alcohol, 3-t-amyl-5-cyclobutyl-4-hydroxybenzyl alcohol. These compounds may be prepared in a variety of ways, such as by the oxidation of 3,5-dialkyl-4-hydroxy toluene to the corresponding 3,5-dialkyl-hydroxybenzaldehyde and the consequent reduction of the latter to the alcohol. The corresponding mercaptans (IV)

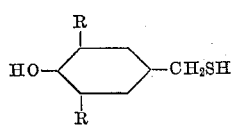

are prepared by reacting 3,5-dialkyl-4-hydroxyl halide with a metal hydrosulfide at room temperature in liquid phase. For example, 3,5-diisopropyl-4-hydroxybenzyl bromide in hexane is reacted with barium hydrosulfide at about 25° C., to yield 3,5-diisopropyl-4-hydroxybenzyl mercaptan. The ether and thioethers of these compounds are also useful in compositions of the present invention and include bis(3-methyl-5-t-butyl-4-hydroxybenzyl)ether, bis(3,5-ditertbutyl-4-hydroxybenzyl)ether, bis(3,5-diisopropyl-4-hydroxybenzyl)mono and disulfide; bis(3-methyl-5-tert-butyl-4-hydroxybenzyl)mono and disulfide; bis(3,5-ditert-butyl-4-hydroxybenzyl)mono and disulfide; bis(3,5-di-tert-octyl-4-hydroxybenzyl)mono and disulfide; bis(3,5-di-tert-amyl-4-hydroxylbenzyl)mono and disulfide; and bis(3-propyl-5-cyclohexyl-4-hydroxybenzyl)mono and disulfide. The sulfides can be prepared by suitable means such as by reacting a mercaptan with 3,5-dialkyl-4-hydroxybenzyl alcohol in the presence of a catalytic amount of a strong acid, e.g., sulfuric acid, phosphoric acid, acetic acid, p-toluenesulfonic acid. Alkyl ethers of these alcohols, such as 3,5-di-tert-butyl-4-hydroxybenzyl methyl ether, may also be reacted with mercaptans under the same conditions to yield the novel sulfides. Any organic sulfides having the formula RSH wherein R is an organic radical may be employed as reactants; typical mercaptans include the alkyl mercaptans, such as methyl mercaptan, ethyl mercaptan, cyclohexyl mercaptan, octyl mercaptan, dodecyl mercaptan and the like; the aromatic mercaptans including thiophenol, thionaphthol, the thiocresols and thioxylenols, and the like, and similar mercaptans. In these, or other ways, such compounds as 3,5-diisopropyl-4-hydroxybenzyl palmityl sulfide; 3-methyl-5-tert-octyl-4-hydroxybenzyl phenyl sulfide, 3,5-di-tert-butyl-4-hydroxybenzyl cresyl sulfide and the like may readily be obtained.

The additive combination of the present invention when used in amounts ranging from 0.01 to 10%, preferably from 0.5% to 6% each, imparts properties to hydrocarbons of the lubricating oil range which make them highly effective in insuring engine cleanliness, essentially no corrosion and very low wear when they are used for the lubrication of internal combustion engines, and particularly spark ignition engines which are operated on fuels which contain metal-containing substances, such as organometallic anti-knock agents, and the like. This coaction is obtained in various hydrocarbon lubricating oils, whether or natural origin or synthetic, especially oils which are substantially paraffinic and/or naphthenic; they may contain substantial proportions of hydrocarbons having aromatic character but the amounts and types of components should be such that the Dean and Davis (Chem. and Met. Eng., vol. 36, 1929, pp. 618–619) viscosity index of the base oil is at least 80, preferably at least 90 to 150.

The oil may be derived from a highly paraffinic crude, in which case distillation and/or dewaxing may be sufficient to provide a suitable base stock; a minimum of chemical or selective solvent treatment may be used if desired. Mixed base crudes and even highly aromatic crudes which contain paraffinic hydrocarbons also provide suitable oil base stocks by well known refining techniques. Usually these comprise the separation of distillate fractions of suitable boiling range followed by selective solvent extraction with solvents such as furfural, phenol and the like to provide raffinate fractions which are suitable for further refining by dewaxing and chemical treatment such as sulfuric acid treatment, etc. Thus, it may be a refined hydrocarbon oil obtained from a paraffinic, naphthenic, asphaltic or mixed base crude, and/or mixtures thereof, such as SAE 5W, 10W, 20W, 20, 30, 40, 50 mineral oils. The hydrocarbon oils may be blended of different mineral oil distillates and bright stock; they may have blended therewith in minor but compatible proportions fixed oils, such as castor oil, lard oil and the like and/or with synthetic lubricants, such as polymerized olefins, e.g., polyisobutylene.

The following compositions are representative of the invention.

Composition A:                                 Percent wt.
    Example II copolymer _____ 5
    3,5-ditert.butyl-4-hydroxybenzyl alcohol _____ 0.5
    Bright stock _____ 6
    Mineral lubricating oil (10W–30) _____ Balance
Composition B:
    Example II copolymer _____ 5
    3,5-ditert.butyl-4-hydroxybenzyl mercaptan ___ 0.5
    Bright stock _____ 6
    Mineral lubricating oil (10W–30) _____ Balance
Composition C:
    Example II copolymer _____ 5
    3,5-ditert.butyl-4-hydroxybenzyl sulfide _____ 0.5
    Bright stock _____ 6
    Mineral lubricating oil (10W–30) _____ Balance
Composition D:
    Copolymer of lauryl methacrylate/N-vinyl pyrrolidone (M.W.=600,000) _____ 5.5
    3,5-ditert.butyl-4-hydroxybenzyl alcohol _____ 0.5
    Mineral lubricating oil (SAE 30) _____ Balance
Composition E:
    Copolymer of 2-methyl-5-vinyl pyridine/lauryl methacrylate/stearyl methacrylate (M.W 650,-000) _____ 5.5
    3,5-ditert.butyl-4-hydroxybenzyl alcohol _____ 0.3
    Mineral lubricating oil (1010 mineral oil) _ Balance In order to demonstrate the utility and improve properties of lubricating compositions of this invention, the compositions identified in Table I were tested in a Chevrolet engine under L-4 test conditions described in CRC Progress Report No. 3, June 1, 1957, and the results were as follows:

*Table I*

| Composition | Piston Varnish (10= perfect) | Total Varnish (50= perfect) | Final Rating (100= perfect) | Cu-Pb Bearing wt. loss, Mg. |
|---|---|---|---|---|
| (1) Mineral lubricating oil___ | 9.1 | 48.1 | 95.6 | 6,243 |
| (2) (1)+0.5% phenyl-α-naphthylamine_____ | 9.1 | 47.4 | 96.4 | 4,379 |
| (3) (1)+0.5% Cd diamyl dithiocarbamate_____ | 9.4 | 47.8 | 95.4 | 2,502 |
| (4) Composition A_____ | 9.3 | 48.6 | 97.8 | 178 |

Lubricating compositions of this invention are particularly applicable for high temperature, high speed use as in aviation engines, automotive engines and truck engines, as well as industrial equipment operating under the conditions described in this invention.

I claim as my invention:

An improved detergent and corrosion resistant mineral lubricating oil comprising a major amount of mineral lubricating oil and from about 0.5% to about 6% each of an oil-soluble copolymer of a vinyl pyridine and a long-chain $C_{10-20}$ alkyl methacrylate having a molecular weight of from 200,000 to 850,000 and 3,5-diterт butyl-4-hydroxybenzyl alcohol.

References Cited by the Examiner

UNITED STATES PATENTS

| | | | |
|---|---|---|---|
| 2,202,825 | 6/40 | Brandes | 252—393 X |
| 2,488,134 | 11/49 | Mikeska et al. | 260—621 |
| 2,838,571 | 6/58 | Filbey | 252—404 X |
| 2,839,512 | 6/58 | Barnum et al. | 252—51.5 |
| 2,889,282 | 6/59 | Lorensen et al. | 252—51.5 |
| 2,891,966 | 6/59 | Vesely et al. | 260—621 |
| 2,892,785 | 6/59 | Harle et al. | 252—51.5 |
| 3,030,303 | 4/62 | Ryan | 252—51.5 |
| 3,052,630 | 9/62 | Anderson | 252—51.5 X |
| 3,085,003 | 4/63 | Morris | 252—52 X |

OTHER REFERENCES

Cohen: 22 J. Organic Chem., 1333–35, November 1957.

DANIEL E. WYMAN, *Primary Examiner*.

JULIUS GREENWALD, *Examiner*.